Feb. 18, 1969

C. O'REILLY 3,427,957

FRYING PAN INSERT

Filed March 31, 1967

INVENTOR.
CAMPBELL O'REILLY
BY John P. Chandler
HIS ATTORNEY.

United States Patent Office 3,427,957
Patented Feb. 18, 1969

3,427,957
FRYING PAN INSERT
Campbell O'Reilly, 30 W. 11th St.,
New York, N.Y. 10011
Filed Mar. 31, 1967, Ser. No. 627,397
U.S. Cl. 99—446        1 Claim
Int. Cl. A47j 37/10, 36/36

ABSTRACT OF THE DISCLOSURE

An insert for a frying pan and having a concave or convex upper face which is supported in heat conductive but spaced relation to the frying pan surface and allows grease from bacon, etc. to flow away from the surface.

---

Figure 1:
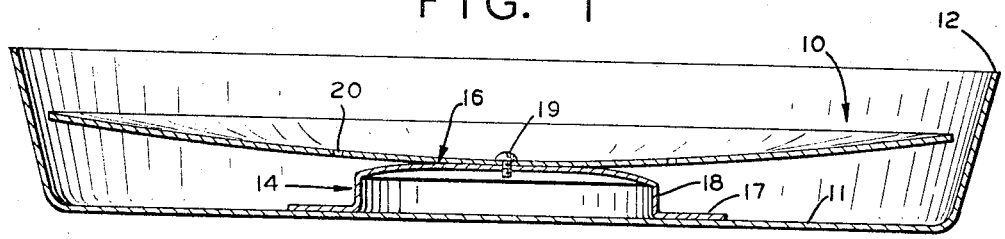

This invention relates to a frying pan accessory comprising an insert to be placed in the pan and formed with a spherical surface contour and supported by the pan, either by a separate supporting element or by a central downwardly projecting section formed integrally with the insert, in heat conducting relation with the frying pan surface normally used for cooking.

Foods such as bacon and sausage, which have a high percentage of fat which is removed during the cooking operation, are ideally cooked with heat from above in order to allow the fat particles to drip downwardly into a collection vessel. Such broiling devices are generally not favored by the housewife because they are relatively more expensive than a frying pan; they would be used at most only intermittently; and they are not designed for effective use in other broiling operations, such as for broiling steaks and chicken parts.

An important object of the present invention is to provide an inexpensive insert which can be used in connection with a conventional frying pan and supported in heat conductive relation to the heated face of the pan but in spaced relation thereto. The insert is formed with a spherical heating surface, either concave or convex, which permits the grease to flow away in a thin film onto the frying pan surface as it is removed from the meat due to the action of the heat.

If this insert has a convex upper surface the central section is only slightly higher than the peripheral edges and the grease passes downwardly over the edges. If, on the other hand, the surface is concave, a number of drain apertures are formed near the center to permit drain-through of the grease. The supplemental heating surface is supported in this spaced relation to the face of the frying pan by some pedestal arrangement which may, if desired, be formed integrally with the insert.

The continuous, spherical cooking surface gives far better cooking results than a ribbed grill and is much easier to clean. Moreover, the grease is removed from the cooking surface as rapidly as it is forced out by the heat and at no time is the bacon or sausage immersed in the grease to give it a "deep fat" cooking operation.

Figure 2:
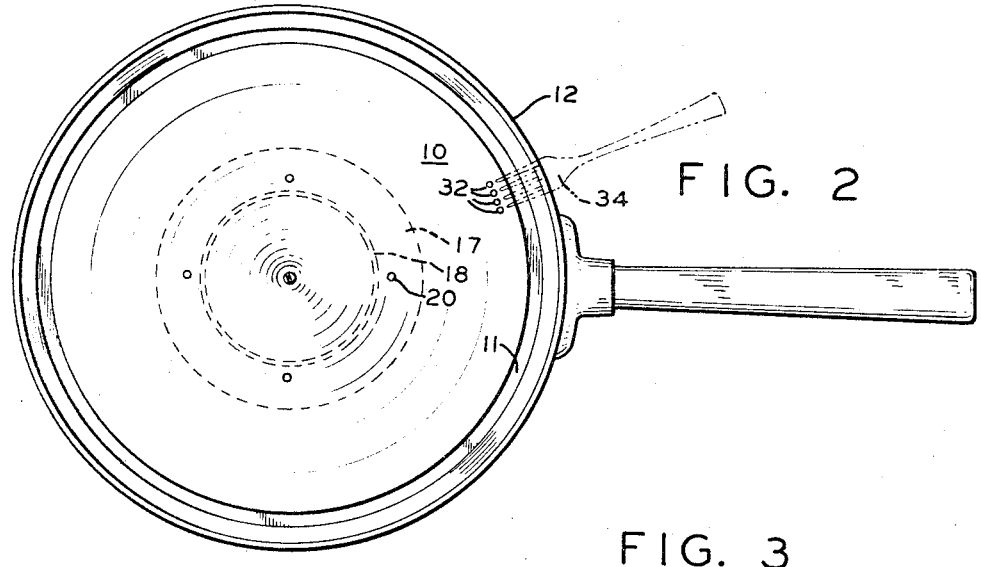
Figure 3:
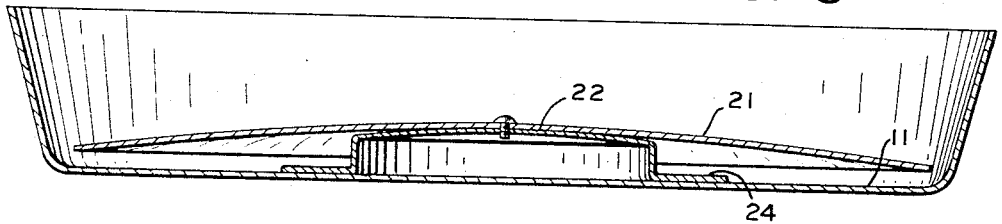
Figure 4:
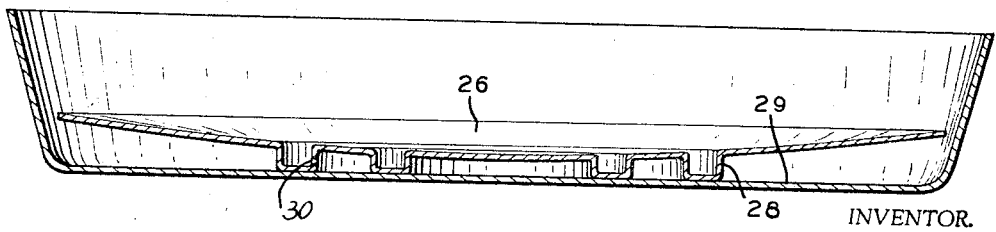

In the drawing:

FIG. 1 is a section taken through an embodiment of the present invention and shown in cooking position within a conventional frying pan;

FIG. 2 is a plan view thereof;
FIG. 3 shows a modification;
FIG. 4 shows a further modification.

The insert 10 shown in FIGS 1 and 2 has a concave upper surface and may be stamped from sheet metal. It is supported in spaced relation to the upper cooking face 11 of a conventional frying pan 12 by a circular support 14 in the nature of a pedestal which may also be stamped from sheet metal and has an upper central concave surface 16 shaped to fit and receive the lower central section of the insert. It further has an annular rim 17 contoured to make flat contact with the frying pan heating surface and shallow side walls 18. To facilitate cleaning, the insert is removable from the support and may be secured thereon by a screw 19. In the area of the insert just outside the central support section, there are a number of holes 20 through which the grease may drain.

The embodiment of FIG. 3 is substantially the same as in FIGS. 1 and 2, except, that the insert 21 has a convex upperface and its lower convex surface is supported on a pedestal having a central upper section 22 in close fitting surface contact with the convex surface. It also has an annular rim 24 received on the cooking surface 11 of the frying pan.

The last embodiment of the invention is stamped, spun, turned or otherwise formed in a single piece from sheet metal or it may be cast. It has an upper concave cooking surface 26 and has one or more downwardly protruded annular recesses forming annular ribs 28 having flat lower surface which engage the upper face of the frying pan 29. The sides of these ribs have openings 30 to drain the grease.

Any one of the inserts may be readily removed from the frying pan before the accumulated grease is to be poured therefrom.

FIG. 2 shows a simple arrangement of providing four holes 32 which may be spaced apart a distance equal to the average spacing between the tines of a kitchen fork shown at 34. The tines are inserted in the hole and the insert raised and removed.

While there have been described herein what are at present considered preferred embodiments of the invention, it will be obvious to those skilled in the art that many modifications and changes may be made therein without departing from the essence of the invention. It is, therefore, to be understood that the exemplary embodiments are illustrative and not restrictive of the invention, the scope of which is defined in the appended claims, and that all modifications that come within the meaning and range of equivalency of the claim are intended to be included therein.

The embodiments of the invention in which an exclusive property or privilege is claimed are defined as follows:

1. An insert to be received in a frying pan or the like and formed from relatively thin metal with a spherical upper face which receives food products to be cooked, and a support for maintaining said insert in heat conductive, spaced relation to the upper face of said frying pan, said support comprising a downwardly extending annular rib with a flat lower face, which engages said frying pan, said rib having a drainage opening therein.

(References on following page)

References Cited

UNITED STATES PATENTS

| | | | |
|---|---|---|---|
| 100,397 | 3/1870 | Hamilton | 99—340 |
| 1,344,915 | 6/1920 | Deming. | |
| 1,344,915 | 6/1920 | Love | 99—446 XR |
| 1,469,508 | 10/1923 | Gosselin | 99—425 |
| 1,753,895 | 4/1930 | Larson et al. | 99—422 XR |
| 2,204,681 | 6/1940 | Kircher | 99—446 XR |
| 2,227,608 | 1/1941 | Tinnerman | 99—446 |
| 2,429,282 | 10/1947 | Van Ness | 99—422 XR |
| 2,732,696 | 1/1956 | Baker | 99—446 XR |

FOREIGN PATENTS

| | | |
|---|---|---|
| 624,264 | 4/1927 | France. |
| 983,612 | 2/1965 | Great Britain. |

WALTER A. SCHEEL, *Primary Examiner.*

JOHN M. NEARY, *Assistant Examiner.*

U.S. Cl. X.R.

99—425